July 8, 1924.
P. H. HUSSEY
REEL HOLDER FOR FISHING RODS
Filed April 19, 1923
1,500,390
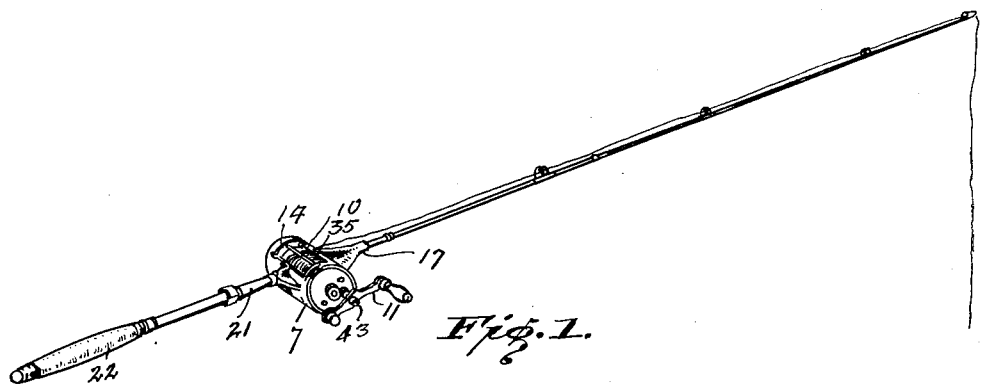
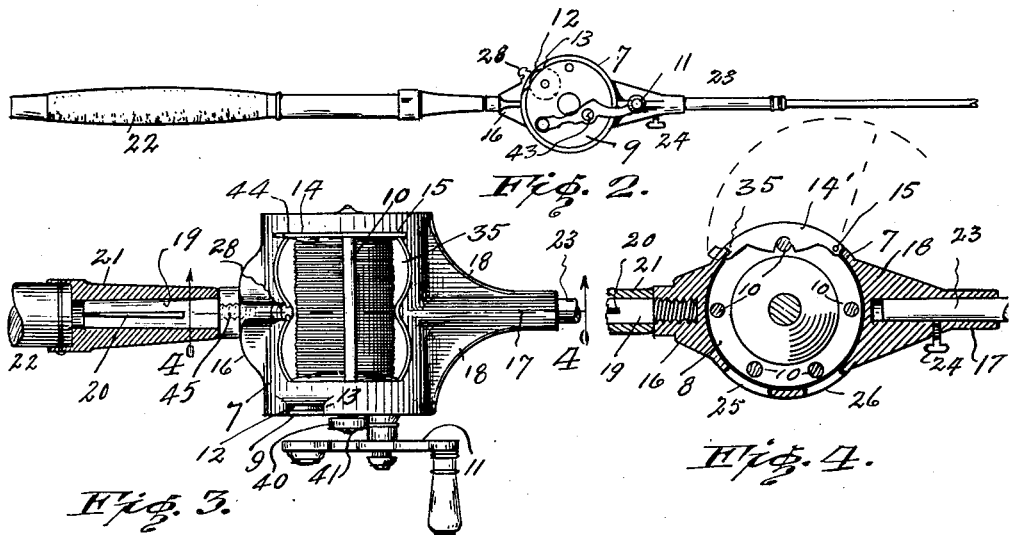
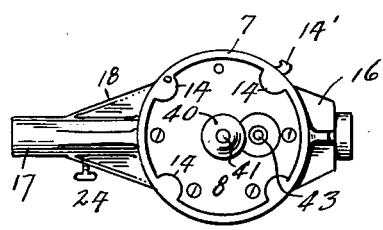
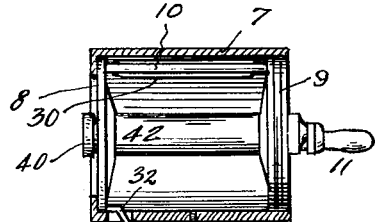
Inventor,
Paul H. Hussey
By Joseph A. Minturn
Attorney Patented July 8, 1924.

1,500,390

UNITED STATES PATENT OFFICE.

PAUL H. HUSSEY, OF INDIANAPOLIS, INDIANA.

REEL HOLDER FOR FISHING RODS.

Application filed April 19, 1923. Serial No. 633,302.

*To all whom it may concern:*

Be it known that I, PAUL H. HUSSEY, a citizen of the United States, residing at Indianapolis, in the county of Marion and State of Indiana, have invented new and useful Improvements in Reel Holders for Fishing Rods, of which the following is a specification.

The object of this invention is to balance the reel on a fishing rod by so mounting it with relation to the rod that the axis of the rod will intersect the axis of rotation of the reel.

A further object is to provide ready means for assembling the reel-holder with the parts of the rod so they may be readily disjointed when desired, for compact storage.

Another object is to provide a holder in which the reel is removably secured, and to provide a convenient means for locking the reel in the holder.

The object also is to provide means for tieing the line when desired so that it will not be unreeled.

I accomplish the above and other objects which will hereinafter appear, by the means illustrated in the accompanying drawing, in which—

Fig. 1, is a perspective view of a fishing rod equipped with my invention. Fig. 2, is a right hand elevation of same on a larger scale. Fig. 3, is a top plan view of the reel-holder and reel showing the handle-end of the rod in longitudinal section. Fig. 4, is a section on the line 4—4 of Fig. 3. Fig. 5, is a view in elevation of the left end of the holder and reel, and Fig. 6 is a vertical section of a reel-holder through the axis of rotation of the reel showing a closed holder and a modified catch means for locking the reel in the holder.

Like characters of reference indicate like parts in the several views of the drawing.

My improved reel-holder comprises a cylindrical body 7 of suitable diameter to receive the disks 8 and 9 of the usual reel-holder with a sliding fit. The disks are spaced apart and held by the connecting rods 10 and the disks support the bearings 40 for a shaft 41 carrying a spool 42 on which the line is wound; and a shorter shaft 43 has a crank 11 for manually operating it and the two shafts are connected by the usual speeding gear (not shown) which is housed within the disk 9 adjacent the crank. Some reels have a brake-wheel 12 that projects sufficiently beyond the periphery of the gear-housing disk to be accessible for hand manipulation, and the cylinder 7 is suitably cut away at 13 to allow for the required access to the wheel 12.

The frame and reel as above described are of usual and suitable construction and they are introduced telescopically in the housing with the disk 8 entered first. The insertion is arrested by a series of inwardly projecting lugs 14 on the disk 7, as best shown in Fig. 5, and accidental withdrawal of the frame and reel from the cylindrical body 7 is prevented by a locking lever 14'. One end of the lever 14' is pivoted at 15 to the body 7, and the other end of the lever is frictionally held in a notch 44 in the cylindrical body. The lever crosses a top opening 35 provided in the cylinder 7 for the passage and free operation of the fishing line, in an edge of which opening the lever-locking notch is formed. The lever 14' has a notch on its underside to receive a rod 10 of the reel-frame and by engagement therewith to hold a frame from rotation within the cylinder.

A boss 16 is formed on that side of the cylinder 7 which is held, in use, next to the body of the fisherman; and on the diametrically opposite side is a cylindrical extension 17 with fillets 18. A screw-threaded hole is made in the boss 16 to receive the screw-end 45 of a dowel-pin 19 which is preferably of steel or other strong and elastic metal split endwise at 20 to secure an elastic fit in the usual socket 21 of a handle-end 22 of a fishing rod. The extension 17 has a socket to receive the usual dowel-pin 23 of a fishing rod. Ordinarily the fit will be tight enough to hold by friction, but a set-screw 24 may be used as shown to insure a more secure fastening that will keep the line-end of the pole from being withdrawn and run away with by a fish.

The axes of the socket in the extension 17, and of the dowel-pin 19, are in the same straight line, which line intersects the axis of rotation of the reel at right angles in order to balance the holder and reel evenly on the rod.

The cylindrical body 7 and the extensions 16 and 17, are preferably formed out of aluminum on account of the light weight and low corrosive character of that metal, and to additionally lighten the device the top opening 35 is cut away, front and back, as much as possible, and additional underside openings 25 and 26 are made.

A hook 28 is formed on the cylindrical body 7, as shown, upon which the line is looped when it is desired to stop the unreeling of the line in still fishing.

In the modified form shown in Fig. 6, the cylinder is intact all around except for a top slot 30 for the passage of the line. This form is sometimes preferred for the protection that it gives to the reel and other mechanism against sand and dirt that may be splashed up by rain or through which it may be dragged by a rapidly moving fish hooked on the line.

This view shows a catch 32 mounted on a spring-plate 33 and extending through a slot into contact with the disk 8 of the reel-frame. The disk will depress the catch in passing to a position of lock, and the catch is retracted by an outward pull on the adjacent end of the plate 33. The plate covers the slot through which the catch 32 passes.

Having thus fully described my invention, what I claim as new and wish to secure by Letters Patent, is—

1. The combination with a fishing rod, a reel, and a holder in which the reel is rotatably mounted comprising end disks connected by rods, of a cylindrical body to which the line end of the rod is joined diametrically of the cylinder on one side, and to which the handle-end is joined on the diametrically opposite side, and in which the holder and reel are removably held, a lever pivoted at one end to the cylindrical body and having a notch removably engaging one of the rods of the holder.

2. The combination with a fishing rod, a reel, and a holder in which the reel is rotatably mounted, of a cylindrical body to which the rod is attached and in which the holder and reel are assembled, of a pivoted lever adapted to swing to a closed position against the cylindrical body and means in closed position of the lever to engage the lever and lock the reel-holder against motions of rotation and translation in the cylindrical body.

Signed at Indianapolis, Indiana, this the 17th day of April, 1923.

PAUL H. HUSSEY.